(12) United States Patent  
Edwards et al.

(10) Patent No.: US 8,874,667 B2
(45) Date of Patent: Oct. 28, 2014

(54) LINKING TOPICS IN A PUBLISH/SUBSCRIBE MESSAGING ENVIRONMENT

(75) Inventors: Ian C. Edwards, Hants (GB); David J. McCann, Southampton (GB); David Postlethwaite, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 13/100,731

(22) Filed: May 4, 2011

(65) Prior Publication Data

US 2011/0289163 A1 Nov. 24, 2011

(30) Foreign Application Priority Data

May 18, 2010 (EP) .................................... 10163148

(51) Int. Cl.
| | |
|---|---|
| *G06F 15/16* | (2006.01) |
| *G06F 9/54* | (2006.01) |
| *G06Q 10/10* | (2012.01) |
| *H04L 29/08* | (2006.01) |
| *H04L 12/58* | (2006.01) |

(52) U.S. Cl.
CPC .............. *G06Q 10/107* (2013.01); *G06F 9/542* (2013.01); *H04L 67/26* (2013.01); *H04L 12/5855* (2013.01)
USPC ........... 709/206; 709/204; 709/224; 370/270; 370/390; 719/313

(58) Field of Classification Search
CPC ..... H04L 67/26; H04L 12/1859; H04L 51/26; H04L 45/245; H04L 12/5855; G06F 9/546; G06F 9/542

USPC ................. 709/204, 206, 224; 370/270, 390; 719/313
See application file for complete search history.

(56) References Cited

U.S. PATENT DOCUMENTS

| 7,453,812 B1 * | 11/2008 | Hobson et al. ................. 370/238 |
|---|---|---|
| 2003/0135556 A1 * | 7/2003 | Holdsworth ................... 709/206 |
| 2005/0021622 A1 * | 1/2005 | Cullen ........................... 709/204 |
| 2007/0226182 A1 * | 9/2007 | Sobotka et al. .................... 707/3 |
| 2009/0228563 A1 * | 9/2009 | Jones et al. .................... 709/206 |

FOREIGN PATENT DOCUMENTS

WO WO 2007134885 A1 * 11/2007

OTHER PUBLICATIONS

IBM, "Using Handlers in a Topic Space to Establish Non-Hierarchic Relationships", www.ip.com, IPCOM000125712D, Jun. 14, 2005, pp. 1-2.
IBM, "A Method for Linking Functionally Similar Topics in a Publish/Subscribe System", www.ip.com, IPCOM000188560D, Oct. 14, 2009, pp. 1-5.

* cited by examiner

*Primary Examiner* — Hitesh Patel
(74) *Attorney, Agent, or Firm* — A Bruce Clay

(57) ABSTRACT

Topics are linked in a publish/subscribe messaging environment. A first topic is linked to at least a second topic, and a message on the first topic is published to subscribers to the first topic. In the same transaction, any reference to the topics linked to the first topic are published in the message to subscribers of the topics linked to the first topic. A tree of topics is defined with topic nodes for each topic. A topic string is provided in a path through the tree of topics to a topic node, wherein the first topic and the at least a second topic have no commonality of topic string.

12 Claims, 6 Drawing Sheets

LINKING TOPICS IN A PUBLISH/SUBSCRIBE MESSAGING ENVIRONMENT

BACKGROUND

This invention relates, in general, to the field of messaging, and in particular, to linking topics in a publish/subscribe messaging environment.

In a messaging environment where the publish/subscribe paradigm is being used, typically a hierarchy of topics is created where topics further into the hierarchy are more specific to a particular area of interest. For example /SPORT/FOOTBALL/CHELSEA would describe a hierarchy for the Chelsea (within London) football team results. It is possible to subscribe to multiple topics using a wildcard, for example subscribing on /SPORT/FOOTBALL/# would lead to football results for all teams being delivered to the subscriber.

There may be other distinct parts of the topic tree which have a common sub-theme, for example, /NEWS/LONDON. While the themes of both parts of these trees may overlap, there is no commonality in the topic string, or in other words, the themes are on different branches of a tree. It would, therefore, require at least two subscriptions to be able to subscribe to both London-based topics. If a further topic string related to London but with no commonality in the topic string was introduced, it would require a further subscription to get that information.

BRIEF SUMMARY

According to one embodiment of the present invention there is provided a method for linking topics in a publish/subscribe messaging environment. A first topic is linked to at least a second topic. A message on the first topic is published to subscribers to the first topic. In the same transaction, at least a second topic linked to the first topic is referenced to the at least a second topic linked to the first topic. The message is published to subscribers of the at least a second topic linked to the first topic.

According to a second aspect of the present invention, a computer program product links topics in a publish/subscribe messaging environment. The product comprises a computer-readable storage medium, having computer readable program code embodied therewith. Computer readable program code is configured to link a first topic to at least a second topic. Computer readable program code is configured to publish a message on the first topic to subscribers of the first topic. Computer readable program code is configured to reference the at least a second topic linked to the first topic in a same transaction as publishing the message on the first topic According to a third aspect of the present invention, a system links topics in a publish/subscribe messaging environment. A processor and memory are connected to the processor, wherein the memory is encoded with instructions and wherein the instructions when executed comprise instructions for building a tree of topics comprising a topic node for each topic therein, in order to provide a topic string in a path through the tree of topics to a topic node for each topic therein. A linked list is provided at a first topic node of the tree of topics, the linked list comprising at least a second topic node for each topic therein. A message is published a on a first topic to subscribers to the first topic, and, in a same transaction references the linked list, and publishes the message to subscribers of at least a second topic linked to the first topic.

DETAILED DESCRIPTION

Figure 1:
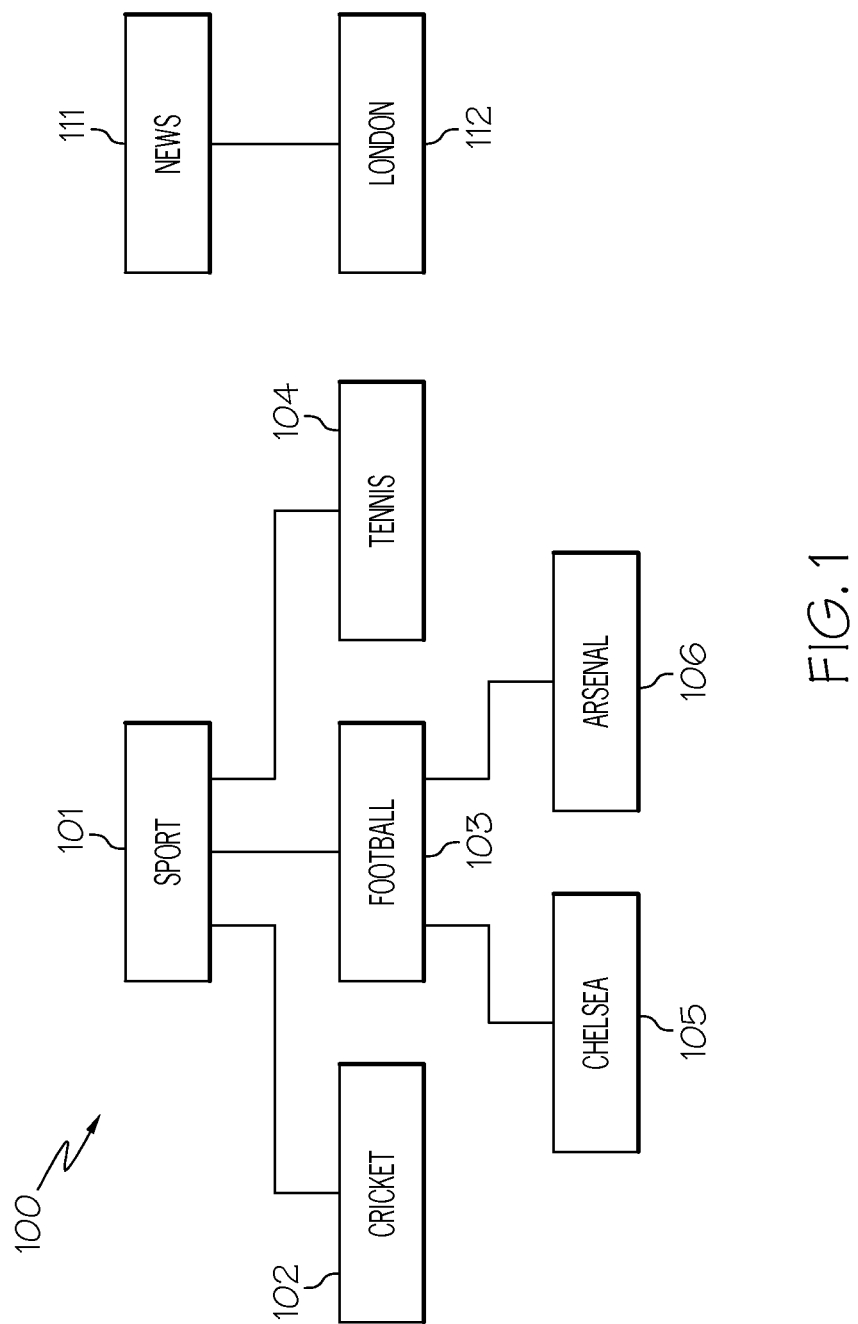
FIG. 1 is a schematic diagram of a topic tree as used in a publish/subscribe messaging environment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Publish/subscribe applications are intended for situations where a single message is required by, and should be distributed to, multiple users. Their advantage over other delivery methods is that they keep the publisher separated from the subscriber. This means that the publisher in a publish/subscribe application does not need to have any knowledge of either the subscriber's existence or the applications that may use the published information. Likewise, the subscriber or subscriber applications do not need to know anything about the publisher application.

Published messages are characterized into classes, without knowledge of what subscribers there may be. Subscribers express interest in one or more classes, and only receive messages that are of interest, without knowledge of what publishers there are. This decoupling of publishers and subscribers can allow for greater scalability and a more dynamic network topology.

Publish/subscribe is typically one part of a larger message-oriented middleware system. Most messaging systems support both the publish/subscribe and message queue models in their application programming interface (API) (e.g. Java Message Service (JMS)).

In the publish/subscribe model, subscribers typically receive only a subset of the total messages published. The process of selecting messages for reception and processing is called filtering. There are two common forms of filtering: topic-based and content-based.

In a topic-based system, messages are published to "topics" or named logical channels. Subscribers in a topic-based system will receive all messages published to the topics to which they subscribe, and all subscribers to a topic will receive the same messages. The publisher is responsible for defining the classes of messages to which subscribers can subscribe.

In many publish/subscribe systems, publishers post messages to an intermediary message broker and subscribers register subscriptions with that broker, letting the broker perform the filtering. The broker matches the publications to the subscribers and ensures that all the messages are made available and delivered to all the subscribers in a timely manner. The broker normally performs a store and forward function to route messages from publishers to subscribers.

Multiple brokers can be connected together, enabling brokers to exchange messages. This allows subscribers to one of the brokers to pick up messages that have been published to another broker, further freeing the subscriber from the constraints of using the same broker as the publisher.

Referring to FIG. 1, in a messaging environment where the publish/subscribe paradigm is being used, typically a hierarchy of topics is created as a topic tree 100 where topic nodes further into the hierarchy are more specific to a particular area of interest.

For example, "sport" may be a root node 101 with branch nodes of "cricket" 102, "football" 103, and "tennis" 104. The branch node of "football" 103 in turn may have child nodes of "Chelsea" 105, "Arsenal" 106, etc. The topic string of /SPORT/FOOTBALL/CHELSEA would describe the route through the hierarchy to the topic node "Chelsea" 105 for the Chelsea (within London) football team results. A subscriber in the messaging environment can subscribe to the topic "Chelsea" to receive published messages for the Chelsea team football results. It is possible to subscribe to multiple topics using a wildcard, for example subscribing on the topic "Football" with the topic string /SPORT/FOOTBALL/# would lead to football results for all teams being delivered to the subscriber.

There may be other distinct parts of the topic tree 100 which have a common sub-theme. For example, "news" may be a root node 111 with a child node of "London" 112 with a topic string /NEWS/LONDON.

While the themes of both parts of these trees may overlap, there is no commonality in the topic strings /SPORT/FOOTBALL/CHELSEA and /NEWS/LONDON. Conventionally, it would require at least two subscriptions to be able to subscribe to both topics. If a further topic string related to London but with no commonality in the topic string was introduced it would typically require a further subscription to get that information.

In an embodiment of the present invention, an administrator of the messaging environment defines a topic which is linked to one or more previously defined topics. Whenever a message is published on any of those linked topics it automatically gets published on the new topic as well.

It is then possible for an application to subscribe on the new topic and receive messages for multiple topics on the single subscription, potentially all with a related theme but with no commonality of topic string.

In addition, the administrator can add or remove topic links without the application having to change its subscription.

When a topic is created that has linked topics associated with it, the topic manager would mark the linked topics in a way as to indicate that when a publish operation occurs, a publish operation should also take place on the topic it is linked with within the same unit-of-work. No change to the way subscriptions work would be needed.

When a publish/subscribe broker starts up, it builds a tree of topics that it knows about. Each point in the tree is known as a topic node and refers to a particular topic string.

In conventional systems, this tree of topic nodes is built from the topic strings contained within topic objects and those upon which existing subscriptions exist. During run time, the list of subscribers on a given topic string is maintained as a list hanging off the associated topic node: the "subscriber list". When an application publishes a message to a topic string, the associated topic node in the tree is consulted and the message is delivered to the subscribers in the subscriber list, these messages are delivered in a single transactional unit-of-work, and the publisher knows the result at publish time.

The described implementation encompasses linked target topics. To implement linked target topics, at start up, the system, as well as reading the "subscriber list" for the source topic, additionally reads in a list of "linked topic objects" which maps one or more source topic strings to one or more target topic strings.

A link is added from each source topic string's node to each target topic string's node—these links are maintained in a list: the "linked topic nodes." As linked topic objects are updated during run time, the links between source and target topic string nodes are added/removed from the linked topic nodes list.

When an application publishes a message to a topic string, in addition to delivering it to the subscribers in the subscriber list of the source topic node, each of the linked topic nodes in the linked topic nodes list is visited, and the message delivered to each of the subscribers in their subscriber lists. Again, all of the messages are delivered in a single transactional unit-of-work, and the publisher knows the result at publish time.

Figure 2:
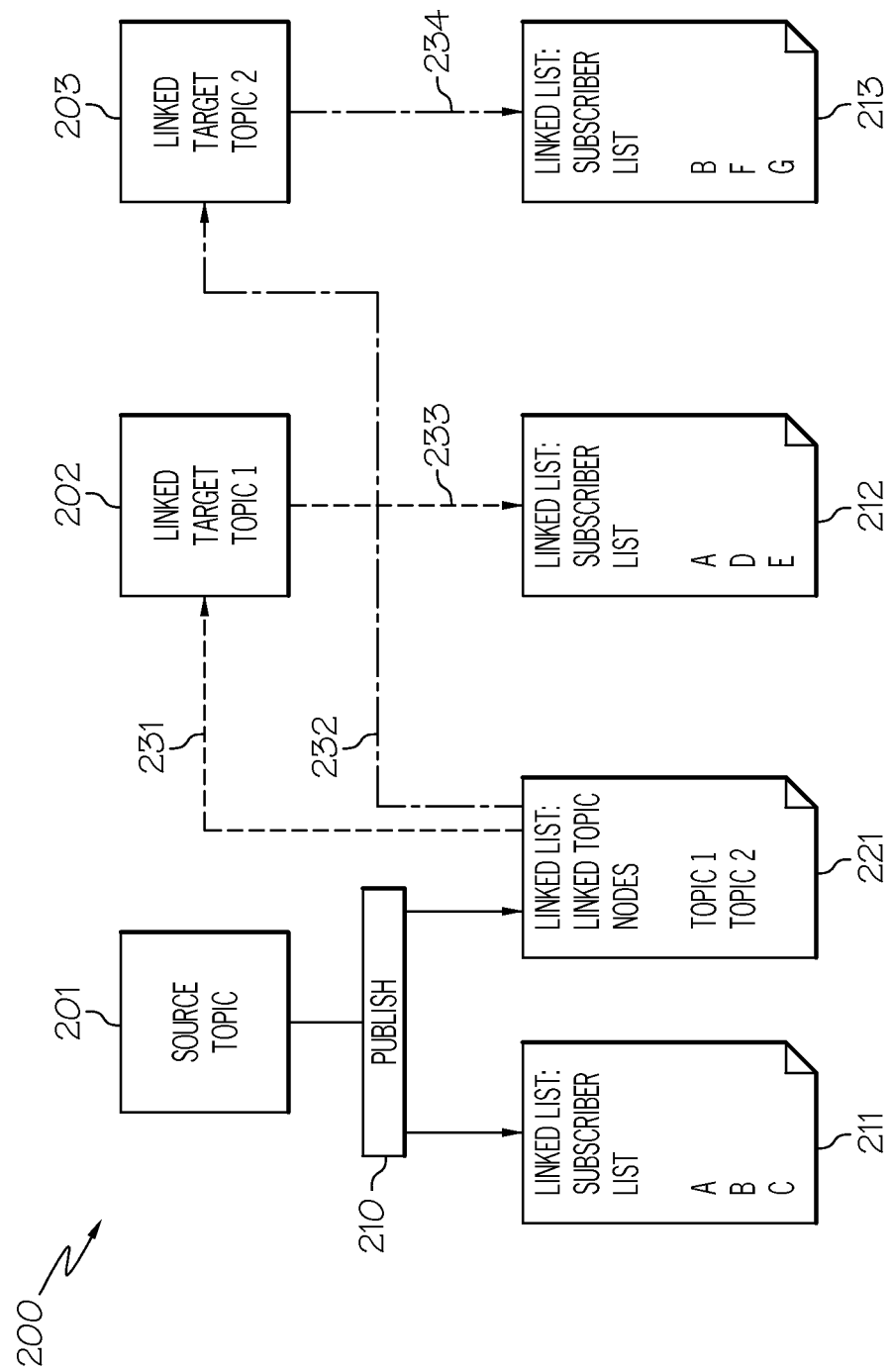
FIG. 2 is a schematic diagram of linked topics in accordance with the present invention.

Referring to FIG. 2, a schematic diagram 200 shows a source topic node 201 which has a linked list of a subscriber list 211 indicating that subscribers A, B, C subscribe to the source topic. The source topic node 201 also has a linked list of linked topic nodes 221 which indicates that the source topic is linked to target nodes Topic 1 and Topic 2.

The target node of Topic 1 202 has a linked list of a subscriber list 212 of subscribers A, D, E subscribing to Topic 1. Similarly, the target node of Topic 2 203 has a linked list of a subscriber list 213 of subscribers B, F, G subscribing to Topic 2.

FIG. 2 shows a publish operation 210 which accesses the linked list of subscribers 211 and sends the publish message to subscribers A, B, and C. Simultaneously in the same transaction, each of the linked target topic nodes (Topic 1, Topic 2) in the linked list of linked topic objects 221 is visited. This is shown by hashed line 231 to target Topic 1 202, and hash/dot line 232 to target Topic 2 203. The message is published to the subscribers A, D, E in the linked list of subscribers 212 of target Topic 1 202, shown by a hashed line 233. The message is also published to the subscribers B, F, G in the linked list of subscribers 213 of target Topic 2 203, shown by a hash/dot line 234.

The publish operation 210 is, therefore, simultaneously in the same unit-of-work sent to subscribers A, B, C, D, E, F and G. A duplicate subscriber checking component ensures that duplicate messages are not sent to a subscriber of more than one of the source topic and the target topics.

In a publish/subscribe system within a messaging environment, the described method shows how to specify links between topics in different branches of the topic hierarchy so that subscribers to a first topic will also automatically receive publications on any linked topics, it being possible to add or remove topic links without the application having to change its subscription.

The implementation of linked topics introduces a linked list into each topic node that, instead of pointing to a linked list of subscriptions, points to a linked list of other topic nodes. The linked list of topic nodes is read during the publication loop, and is modified whenever one topic is linked to another. The implementation includes provision for cyclic dependency checking for linked topic nodes whenever the list is modified. For example, when topicA is linked to topicB, all of the links from topicB (and all of their links, etc.) are followed to ensure that none end up back at topicA.

There is no republication taking place, the published message effectively appears on several different topics at once.

Figure 3:
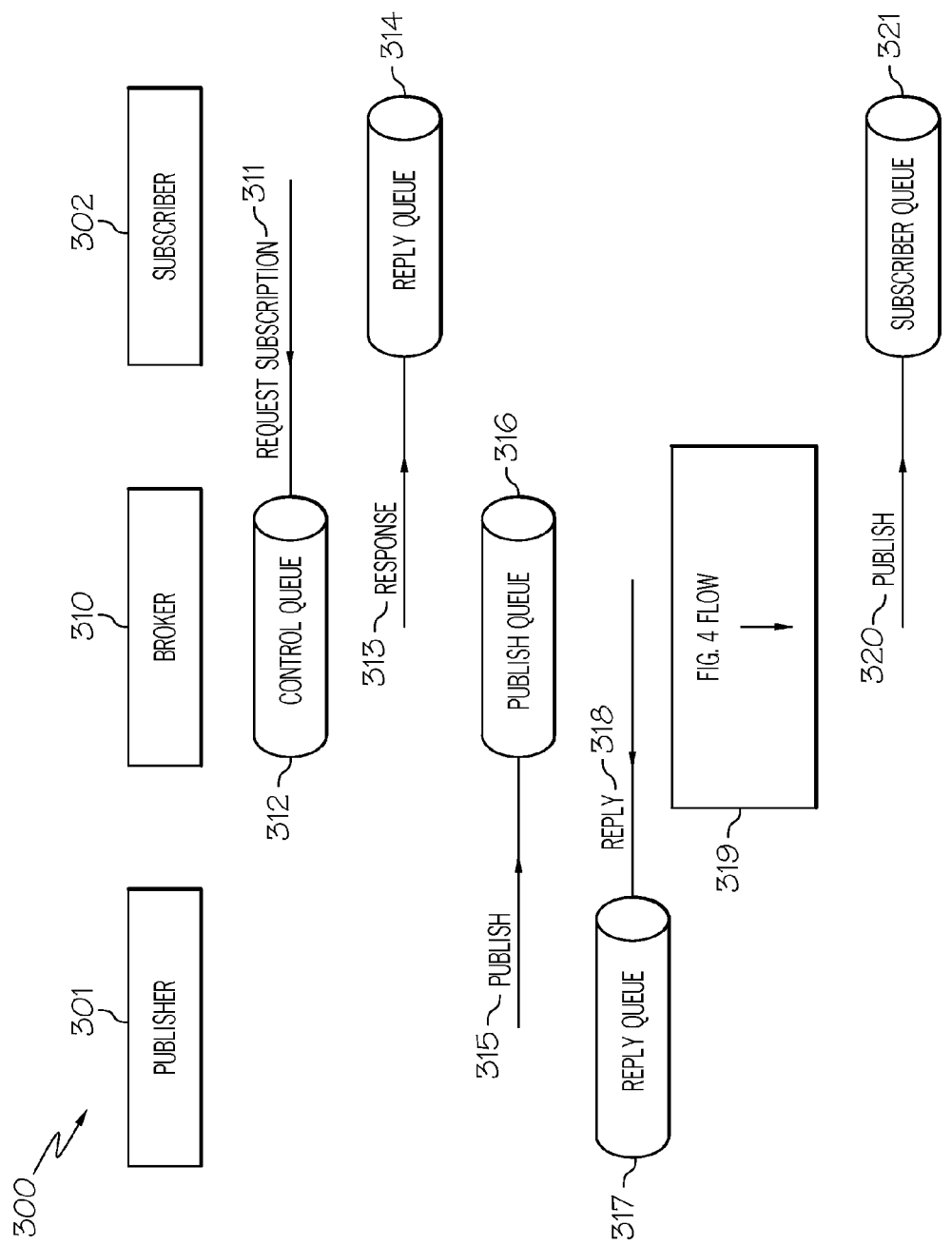
FIG. 3 is a schematic diagram of a publish work flow in accordance with the present invention.

Referring to FIG. 3, a schematic diagram 300 shows an example embodiment of the command flow and destination queues between a publisher 301, broker 310, and subscriber 302. The commands exchanged are messages sent to queues. Other publish/subscribe applications may not use queues, for example, they may handle requests and returns on API (application programming interface) calls.

In this example, during subscription by a subscriber 302 on a topic, the subscriber 302 sends a request subscription message 311 to a control queue 312 on the broker 310. A response message 313 is sent by the broker 310 to a reply queue 314 on the subscriber 302.

A publisher 301 sends a publish message 315 relating to a topic to a publish queue 316 on the broker 310. The broker sends a reply message 318 to a reply queue 317 on the publisher 301. The broker 310 then carries out a method described below, with reference to FIG. 4, to find all subscribers of the topic and all subscribers of linked topics. The publish message 320 is then sent by the broker 310 to the subscriber queue 321 and to other subscriber queues (not shown).

Figure 4:
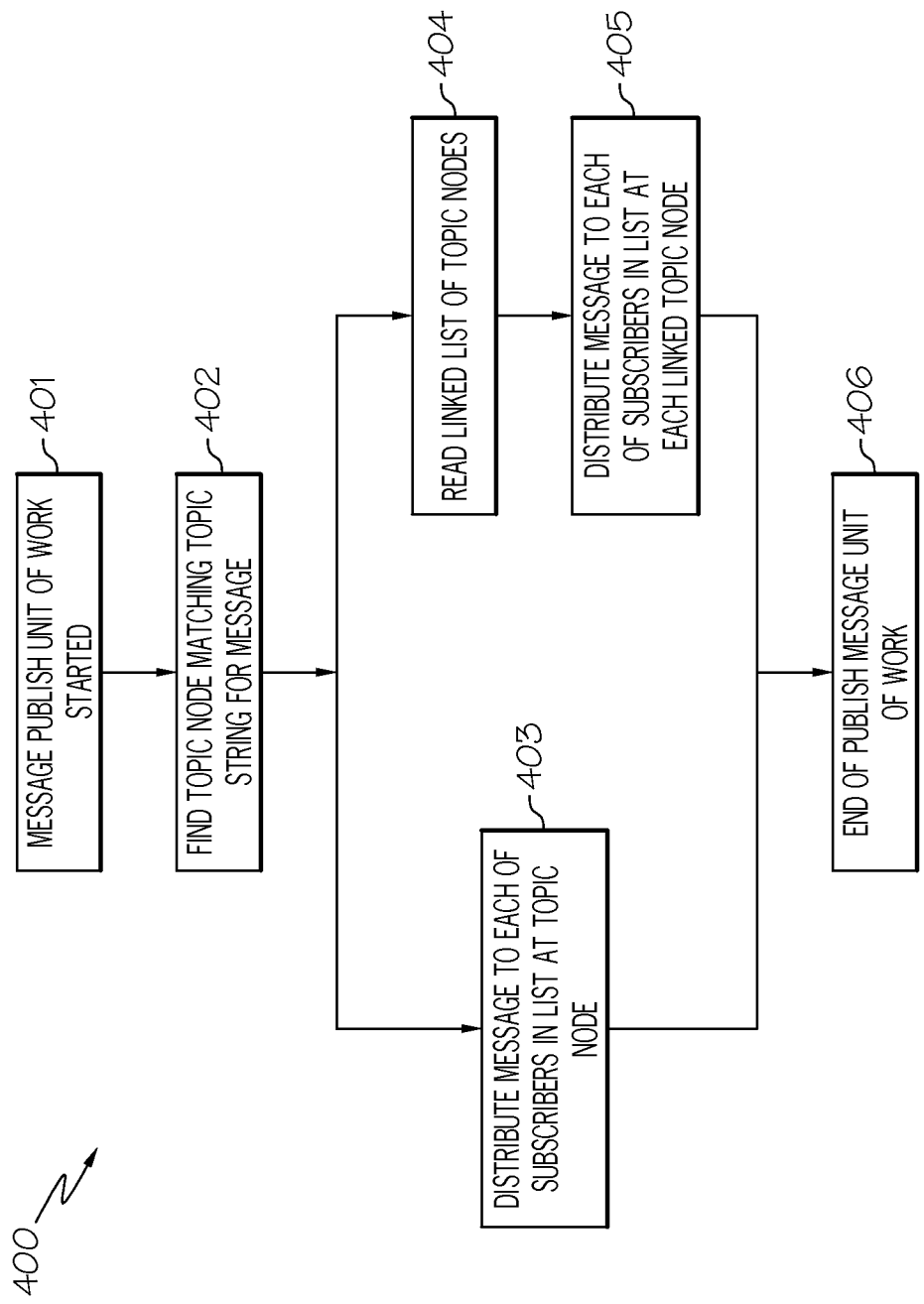
FIG. 4 is a flow diagram of a method in accordance with the present invention.

Referring to FIG. 4, a flow diagram 400 shows the method carried out by a broker. This method could be applied to any system where a publisher wishes to fan the same data out to multiple interested parties. A message broker does this for a message; however, a message may be any data being passed by a broker between interested parties.

A message publish unit-of-work is started 401. A topic node matching the topic string for the message is found 402.

At 403 the method distributes the message to each of the subscribers in the subscriber list at the topic node. Simultaneously, a linked list of linked topic nodes is read 404 at the topic node, and the method distributes 405 the message to each of the subscribers in the subscriber lists at each linked topic node. The publish message unit-of-work then ends 406.

Linked topics may be transitive, i.e. linked topics can themselves be referred to by other linked topics. So where the topic "Sport\Football\Chelsea" is linked to "News\London" in the example given above, and "News\London" is also linked to "News\England," messages published to "Sport\Football\Chelsea" would also be published on "News\England."

Linked topics can be used directly, so messages published to "News\England" directly would be published to "News\England" (but not to "News\London" or "Sport\Football\Chelsea") and messages published to "News\London" would be published to both "News\London" and "News\England" (but not to "Sport\Football\Chelsea"). Unless the backwards link is explicitly requested (at which point the cyclic dependency checking is not performed at link time instead opting to check at publish time that, for each subscriber, they are not already in this unit-of-work) that none is implied.

Linked topics can be recursive, either simply by referring to themselves or cyclically. So, by setting up a link from "TopicA" to "TopicB" and also one from "TopicB" to "TopicA", anything published on either would be published to both. This will also require the inclusion of loop detection logic.

There is protection against the same message being delivered twice to the same subscriber who is subscribed to two or more topics—if a message is effectively published on two of these topics, it will be delivered to the same subscriber only once.

The end-user (the subscriber) does not need to know about the existence of the mappings between topics. The subscriber simply subscribes to the topic they need and an administrator determines that messages published elsewhere in the topic space are also relevant to that topic. The administrator sets up the link and the subscriber starts to receive messages published to topics linked to his subscribed topic.

The linkage between topics has been previously established, and, at publish time, all subscribers on the linked topics are published to. The transactional element of this is that each of the subscriptions listed at each of the original and linked topics are published to in the same unit-of-work. They all receive the message published at the same time, and there is no 'cascading' of publications meaning that all subscribers receive the same context provided by the publisher.

Figure 5:
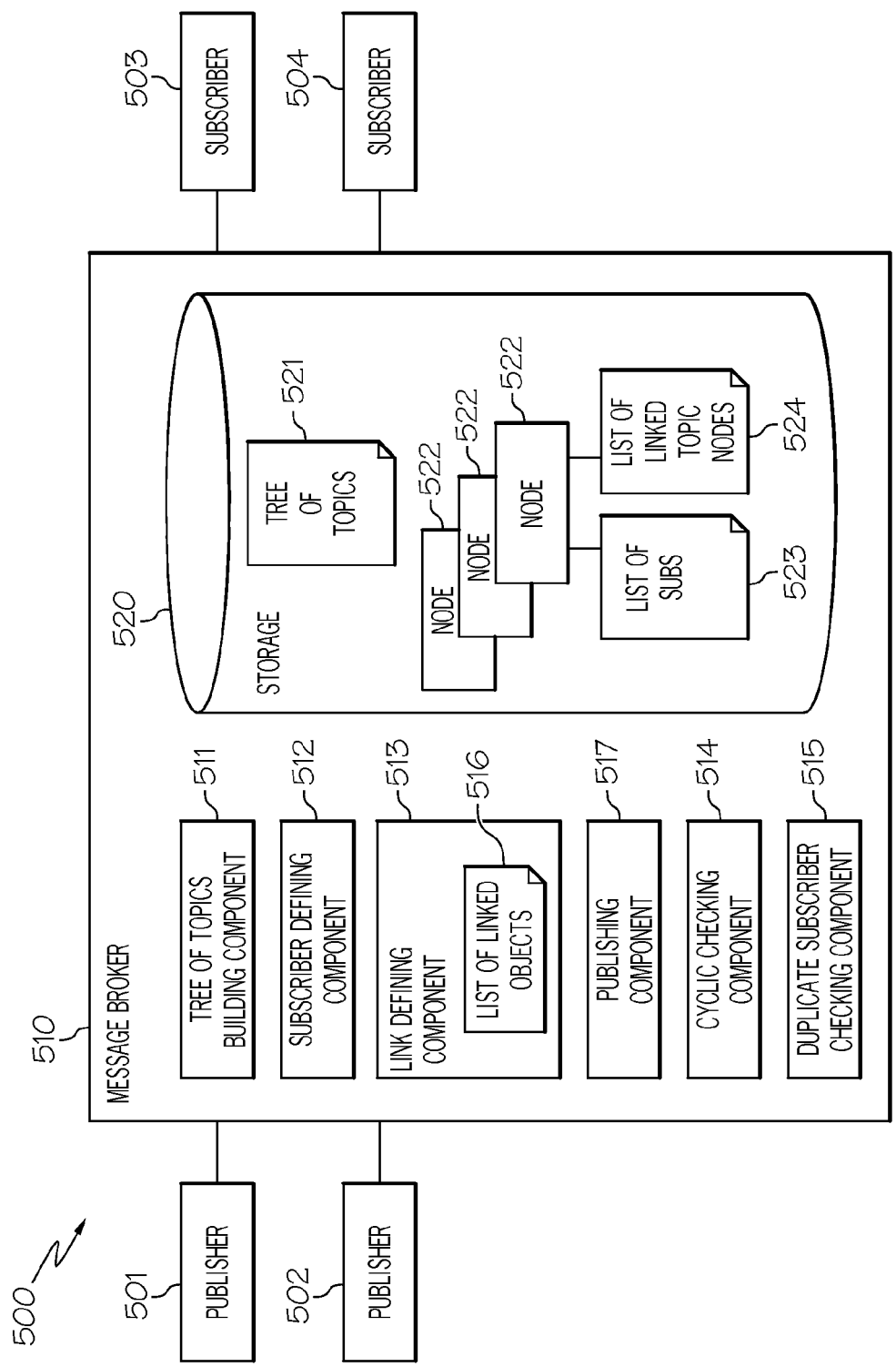
FIG. 5 is a block diagram of a system in accordance with the present invention.

Referring to FIG. 5, a block diagram shows a publish/subscribe messaging system 500. One or more publishers 501, 502 publish messages to a message broker 510. One or more subscribers 503, 504 subscribe to messages at the message broker 510. The system is described in terms of messages; however, messages may be any form of data and a broker may pass the information to other parties who are interested in it.

The messages are published and subscribed to using topic strings. The message broker 510 includes a tree of topics building component 511 for building a tree of topics 521 stored in a storage medium 520.

The tree of topics 521 has topic nodes 522. Each topic node 522 may have a linked list of subscribers 523 and additionally a linked list of linked topic nodes 524.

The message broker 510 includes a subscriber defining component 512 for defining the subscribers to a topic and updating the subscriber lists 523 of the nodes 522 in the stored tree of topics 521.

The message broker 510 includes a link defining component 513 for defining links between topic nodes 522. The link defining component 513 maintains a list of linked objects 516 which is updated by an administrator and updates the linked lists of linked topic nodes 524 of the nodes 522 in the stored tree of topics 521.

The message broker 510 includes a publishing component 517 for publishing a message including using the linked lists of linked topic nodes 524 to distribute a message.

In addition, the message broker 510 includes a cyclic checking component 514 to prevent a message from being published in a recursive loop of inter-linking topic nodes.

The message broker 510 also includes a duplicate subscriber checking component 515 to ensure that messages are not sent more than once to subscribers on linked nodes.

Figure 6:
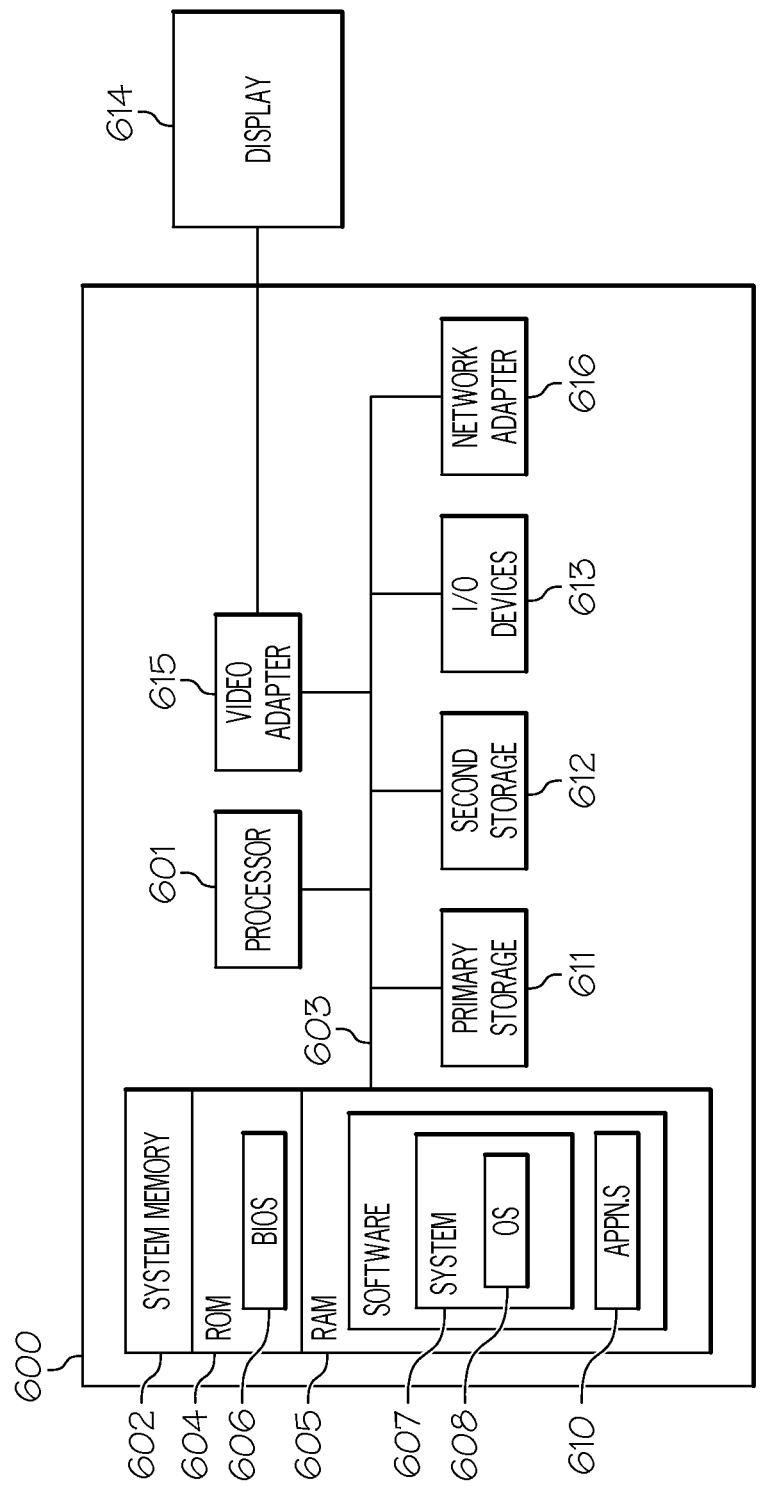
FIG. 6 is a block diagram of a computer system in which the present invention may be implemented.

Referring to FIG. 6, an exemplary system for implementing aspects of the invention includes a data processing system 600 suitable for storing and/or executing program code including at least one processor 601 coupled directly or indirectly to memory elements through a bus system 603. The memory elements can include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. System software 607 may be stored in RAM 605 including operating system software 608. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 can be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

A topic linking component for a publish/subscribe messaging system may be provided as a service to a customer over a network.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of linking topics in a publish/subscribe messaging environment, comprising:
    linking, using a computer processor, a first topic stream of a first root topic to at least a second topic stream of at least a second root topic, wherein there is no commonality between said first topic stream of said first root topic and said at least a second topic stream of said at least a second root topic, and wherein a cyclic check includes loop detection when linking said first root topic to said at least a second root topic;
    at least a first subscriber registering to said first topic stream;
    at least a second subscriber registering to said at least a second topic stream;
    storing, in a node of said first topic stream, a list of said linked at least a second topic stream, wherein said list can be updated at runtime by an administrator to add or remove links;
    publishing, using said computer processor, at least a first message on said first topic stream to said at least a first subscriber of said first topic stream;
    referencing said list of said linked at least a second topic stream in a same transaction as publishing said at least a first message on said first topic stream; and
    publishing said at least a first message to said at least a second subscriber of said linked at least a second topic stream.

2. The method of claim 1, wherein a topic node for wildcard subscriptions is added to said list prior to specifying a wildcard.

3. The method claim 2, wherein said linking includes transitive linking, wherein linked topics are linked to other linked topics.

4. The method of claim 3, wherein said linking includes direct linking.

5. The method of claim 1, including detecting and preventing message duplication to a subscriber of said first root topic and said at least a second root topic.

6. The method of claim 5, wherein publishing said at least a first message to said at least a second subscriber of said at least a second root topic linked to said first root topic is transparent to said at least a first subscriber to said first root topic.

7. The method of claim 1, wherein publishing at least a second message on said second topic stream is not published to said first topic stream.

8. A computer program product for linking topics in a publish/subscribe messaging environment, the computer program product comprising a computer readable storage device having computer readable program code embodied therewith, the computer readable program code comprising:
    computer readable program code configured to link a first topic stream of a first root topic to at least a second topic stream of at least a second root topic, wherein there is no commonality between said first topic stream of said first root topic and said at least a second topic stream of said at least a second root topic, and wherein a cyclic check includes loop detection when linking said first root topic to said at least a second root topic;
    computer readable program code configured to allow at least a first subscriber to register to said first topic stream;
    computer readable program code configured to allow at least a second subscriber to register to said at least a second topic stream;
    computer readable program code configured to store, in a node of said first topic stream, a list of said linked at least a second topic stream, wherein said list can be updated at runtime by an administrator to add or remove links;
    computer readable program code configured to publish at least a first message on said first topic stream to said at least a first subscriber of said first topic stream;
    computer readable program code configured to reference said list of said linked at least a second topic stream in a same transaction as publishing said at least a first message on said first topic stream; and
    computer readable program code configured to publish said at least a first message to said at least a second subscriber of said linked at least a second topic stream.

9. The computer program product of claim 8, wherein computer readable program code configured to publish at least a second message on said second topic stream is not published to said first topic stream.

10. A system for linking topics in a publish/subscribe messaging environment, comprising:
    a processor; and
    memory connected to the processor, wherein the memory is encoded with instructions and wherein the instructions when executed comprise:
    instructions for linking a first topic stream of a first root topic to at least a second topic stream of at least a second root topic, wherein there is no commonality between said first topic stream of said first root topic and said at least a second topic stream of said at least a second root topic, and wherein a cyclic check includes loop detection when linking said first root topic to said at least a second root topic;

instructions for allowing at least a first subscriber to register to said first topic stream;

instructions for allowing at least a second subscriber to register to said at least a second topic stream;

instructions for storing, in a node of said first topic stream, a list of said linked at least a second topic stream, wherein said list can be updated at runtime by an administrator to add or remove links;

instructions for publishing at least a first message on said first topic stream to said at least a first subscriber of said first topic stream;

instructions for referencing said list of said linked at least a second topic stream in a same transaction as publishing said at least a first message on said first topic stream; and instructions for publishing said at least a first message to said at least a second subscriber of said linked at least a second topic stream.

11. The system of claim 10, including a duplicate subscriber checking component for detecting and preventing duplicate publication of a message to a subscriber subscribing to said first root topic and said at least a second root topic.

12. The system of claim 10, wherein instructions for publishing at least a second message on said second topic stream is not published to said first topic stream.

* * * * *